United States Patent
Pal et al.

(10) Patent No.: US 10,619,849 B2
(45) Date of Patent: Apr. 14, 2020

(54) SYSTEMS AND METHODS FOR LEAK DETECTION AND REMOTE, NON-INTRUSIVE, AUTOMATIC SHUTOFF IN RESIDENTIAL REGULATORS

(71) Applicant: Honeywell International Inc., Morristown, NJ (US)

(72) Inventors: Ramkrishna U. Pal, Bangalore (IN); Sridhar Ravilla, Bangalore (IN); Dilip Singh, Bangalore (IN); Debasis Dash, Pune (IN); Unmesh Kulkarni, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/130,016

(22) Filed: Sep. 13, 2018

(65) Prior Publication Data

US 2019/0086080 A1    Mar. 21, 2019

(30) Foreign Application Priority Data

Sep. 16, 2017   (IN) .............................. 201711032823

(51) Int. Cl.
*B29C 49/80* (2006.01)
*F23K 5/16* (2006.01)
(Continued)

(52) U.S. Cl.
CPC ................ *F23K 5/16* (2013.01); *G01M 3/40* (2013.01); *G08B 21/16* (2013.01); *G08B 25/009* (2013.01);
(Continued)

(58) Field of Classification Search
CPC ..... H04W 84/18; H04W 48/18; H04W 4/021; E03B 7/071; G01C 21/20; G01F 15/066;
(Continued)

(56) References Cited

U.S. PATENT DOCUMENTS

| 4,629,157 A | 12/1986 | Tsuchiya et al. |
| 5,501,200 A * | 3/1996 | Bogartz .................. F02B 43/00 123/527 |

(Continued)

FOREIGN PATENT DOCUMENTS

| EP | 0 714 018 A2 | 5/1996 |
| WO | WO 2015/136547 A1 | 9/2015 |

OTHER PUBLICATIONS

Extended search report and written opinion from related European Application No. 18194570, dated Jul. 3, 2019, 12 pages.

*Primary Examiner* — Daniel Previl
(74) *Attorney, Agent, or Firm* — Brooks, Cameron & Huebsch, PLLC

(57) ABSTRACT

Systems and methods for leak detection and remote, non-intrusive, automatic shutoff in residential regulators are provided. Such systems and methods can include a shutoff device that includes a mounting bracket for mounting on a supply container, a linking device for coupling to a knob of a valve of a regulator of the supply container, and an actuator for, responsive to a control signal, automatically rotating the linking device, which rotates the knob, which rotates the valve from an on position to an off position. In some embodiments, a leak sensor can detect a presence of a fuel leak and, responsive thereto, transmit the control signal to the actuator, and in some embodiments, a position sensor can determine that a current position of the valve is indicative of the on position and, responsive thereto, transmit the control signal to the actuator.

20 Claims, 6 Drawing Sheets

(51) Int. Cl.
*G01M 3/40* (2006.01)
*G08B 21/16* (2006.01)
*G08B 25/00* (2006.01)
*G08B 25/10* (2006.01)

(52) U.S. Cl.
CPC .... *G08B 25/10* (2013.01); *F23K 2900/05001* (2013.01); *F23K 2900/05002* (2013.01)

(58) Field of Classification Search
CPC ...... G01F 15/0755; G01F 1/10; G01F 1/3209; G01F 1/58; G01F 1/66; G01F 1/68; G01F 1/84; G01N 21/39; G01N 2201/06113; G01S 17/89; G06F 16/29; G06F 16/5866; G08B 25/10; G08B 21/16; G08B 25/009; H04Q 9/00; Y02A 20/218; Y02A 20/16; Y02A 20/15; Y10T 137/86389; Y10T 137/86397; Y10T 137/8158; B63B 2203/00; B63B 2207/00; B63B 22/12; B63C 7/10; B63C 7/26; F16K 31/02; F16K 31/05; G06Q 50/06; H04L 12/2803; H04L 12/2827; Y02D 70/10; Y02D 70/14; F23K 2900/05001; F23K 2900/05002; F23K 5/16; G01M 3/00; G01M 3/40; Y04S 10/54

USPC ............... 340/605, 602, 610, 613, 619, 632, 340/636.17, 662, 691.6, 686.1
See application file for complete search history.

(56) References Cited

U.S. PATENT DOCUMENTS

| | | | |
|---|---|---|---|
| 6,239,414 B1* | 5/2001 | Newcomer | H05B 1/0222 219/447.1 |
| 8,511,345 B2* | 8/2013 | Bavishi | F23K 5/007 137/237 |
| 2009/0068504 A1* | 3/2009 | Andersen | H01M 8/04089 429/429 |
| 2011/0139928 A1* | 6/2011 | Morris | B64C 27/02 244/1 TD |
| 2012/0132838 A1 | 5/2012 | Staffiere et al. | |
| 2014/0238503 A1* | 8/2014 | Gurule | B25F 1/00 137/15.17 |
| 2014/0264111 A1 | 9/2014 | Porter et al. | |
| 2015/0107676 A1* | 4/2015 | Green | G05D 9/12 137/2 |
| 2017/0085843 A1* | 3/2017 | Scalisi | G08B 13/248 |
| 2017/0098285 A1* | 4/2017 | Smith | G06Q 50/06 |

* cited by examiner

Top View

3D View

SYSTEMS AND METHODS FOR LEAK DETECTION AND REMOTE, NON-INTRUSIVE, AUTOMATIC SHUTOFF IN RESIDENTIAL REGULATORS

CROSS REFERENCE TO RELATED APPLICATIONS

This application claims priority to Indian Provisional Patent Application No. 201711032823 filed Sep. 16, 2017 and titled "SYSTEMS AND METHODS FOR LPG LEAK DETECTION AND REMOTE, NON-INTRUSIVE, AUTOMATIC SHUTOFF IN RESIDENTIAL LPG REGULATORS." Indian Provisional Patent Application No. 201711032823 is hereby incorporated by reference.

FIELD

The present invention relates generally to regulators and leak detection. More particularly, the present invention relates to systems and methods for leak detection and remote, non-intrusive, automatic shutoff in residential regulators.

BACKGROUND

Millions of households use liquid petroleum gas (LPG) and other similar gas and liquid fuels for cooking and other applications. LPG is a clean fuel. Nevertheless, if a fuel leak in a home is not detected and controlled or rectified within a timely manner, then the fuel leak could lead to a safety hazard, including property loss or death of occupants in the home.

Some systems and methods for detecting such a leak and known in the art include a user output device, such as an annunciator (buzzer) or a light (LED), notifying an occupant of an ambient region about the leak. However, such systems and methods do not have connectivity outside of the ambient region. Accordingly, the occupant will not be notified about the leak if he is outside of the ambient region. Furthermore, such systems and methods prompt the occupant to manually turn off a regulator to control or rectify the leak, which is high risk, unsafe, and a fire hazard.

In view of the above, there is a continuing, ongoing need for improved systems and methods.

DETAILED DESCRIPTION

Figure 1:
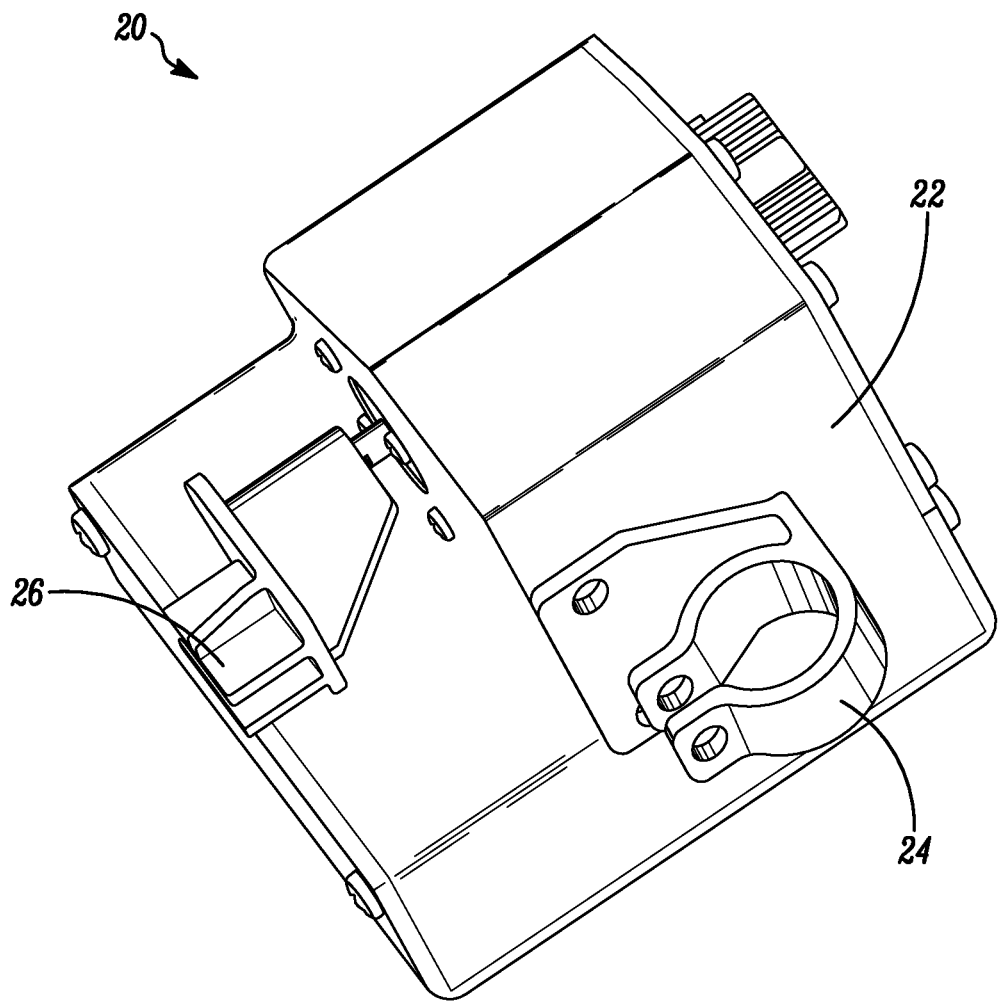
FIG. 1 is a perspective view of a shutoff device in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for fuel leak detection and remote, non-intrusive, automatic shutoff in residential fuel regulators, such as LPG regulators. For example, in accordance with disclosed embodiments, a shutoff device can be coupled to or mounted on a regulator at an end of a cylinder or a supply container of LPG or other fuel, can detect a leak, and responsive thereto, can automatically shut off a valve of the regulator to stop the leak.

In some embodiments, the shutoff device disclosed herein can sense, detect, or determine a current position of a knob of the regulator that controls the valve. For example, the shutoff device can determine that the current position of the knob is indicative of the valve being on or open. Responsive thereto, responsive to detecting the leak, or responsive to receiving a control signal instructing the shutoff device to shut off the valve, the shutoff device can cause the knob to turn until the shutoff device senses, detects, or determines that the current position of the knob is indicative of the valve being off or closed.

In some embodiments, the shutoff device disclosed herein can include a transceiver device for communicating with a remote device or a mobile software application running on the remote device via the Internet or a local area network. Furthermore, in some embodiments, another device, for example, a sensor device, can detect the leak and transmit a detection signal to the remote device or the mobile software application. Responsive to the detection signal, the remote device or the mobile software application can transmit the control signal to the shutoff device, and responsive to the control signal, the shutoff device can shut off the valve to stop the leak. Additionally or alternatively, in some embodiments, the shutoff device can transmit a status report or an incident report to the remote device or the mobile software application identifying a status of the shutoff device or the regulator or identifying incidents of the leak being detected or the valve being shut off to stop the leak.

In some embodiments, the shutoff device disclosed herein can be programmed to shut off the valve to prevent the fuel from being dispensed at a predetermined time. For example, in some embodiments, the shutoff device can be programmed to shut off the valve at a first predetermined time, for example, at night, and turn the valve back on at a second predetermined time, for example, in the morning, so that the fuel is not dispensed overnight. Additionally or alternatively, in some embodiments, the shutoff device can be programmed to shut off the valve when an occupant of an ambient region is scheduled to or is leaving the ambient region. In some embodiments, the shutoff device can be programmed via the mobile software application in communication with the shutoff device.

Figure 5:
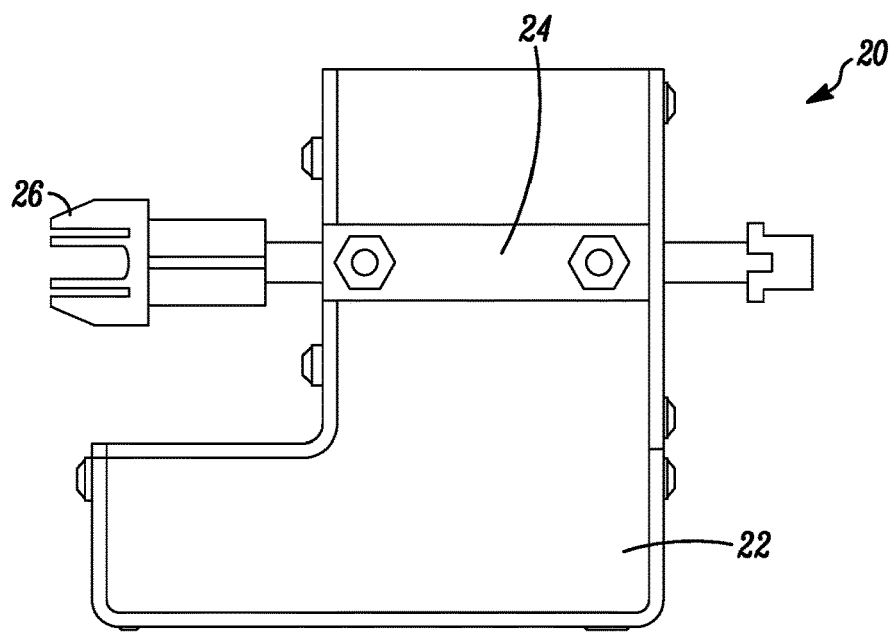
FIG. 5 is a top view of a shutoff device in accordance with disclosed embodiments.
Figure 6:
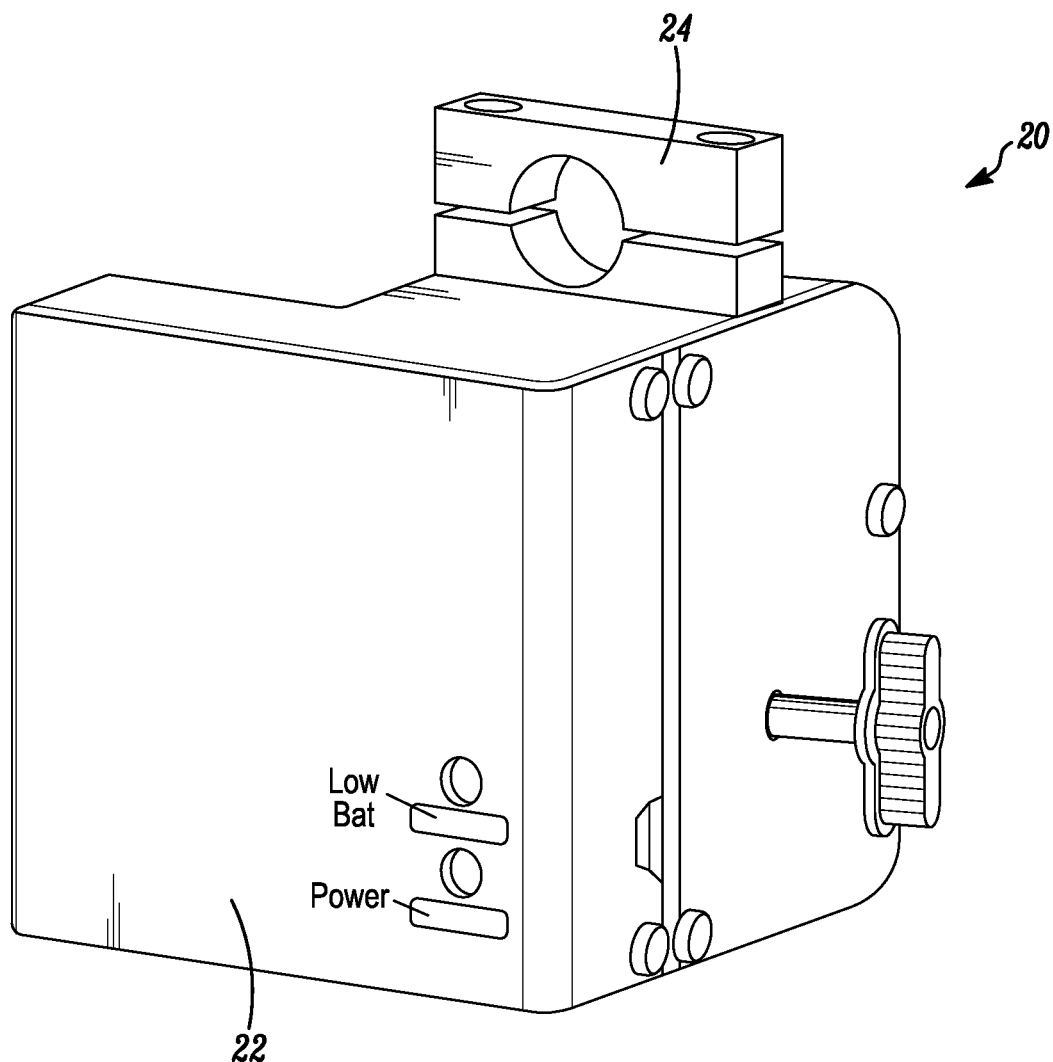
FIG. 6 is a perspective view of a shutoff device in accordance with disclosed embodiments.

FIG. 1 is a perspective view of the shutoff device 20 in accordance with disclosed embodiments, FIG. 5 is a top view of the shutoff device 20 in accordance with disclosed embodiments, and FIG. 6 is a side view of the shutoff device 20 in accordance with disclosed embodiments. As seen in FIG. 1, FIG. 5, and FIG. 6, the shutoff device 20 can include an actuator 22, a mounting bracket 24, and a linking device 26.

Figure 2:
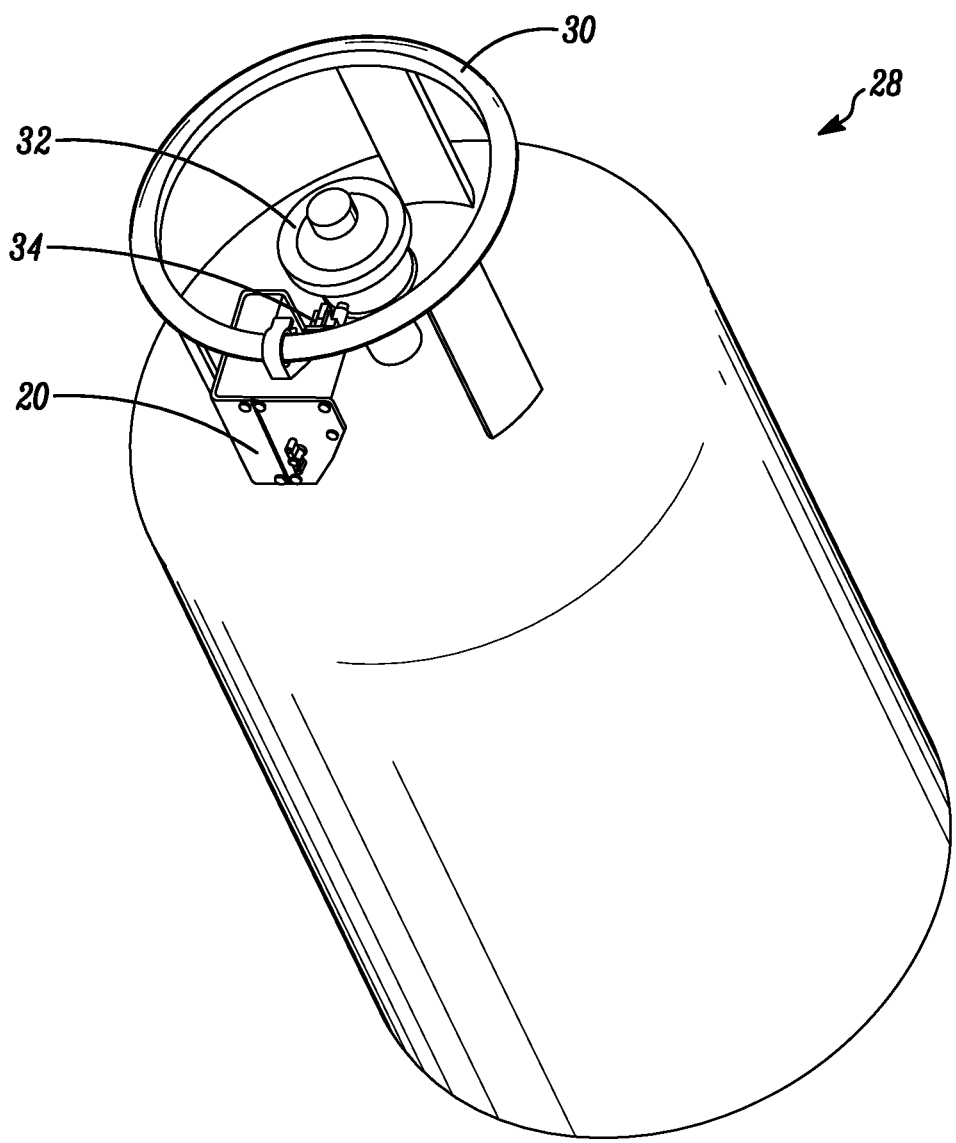
FIG. 2 is a perspective view of a shutoff device coupled to or mounted on a fuel cylinder in accordance with disclosed embodiments.
Figure 3:
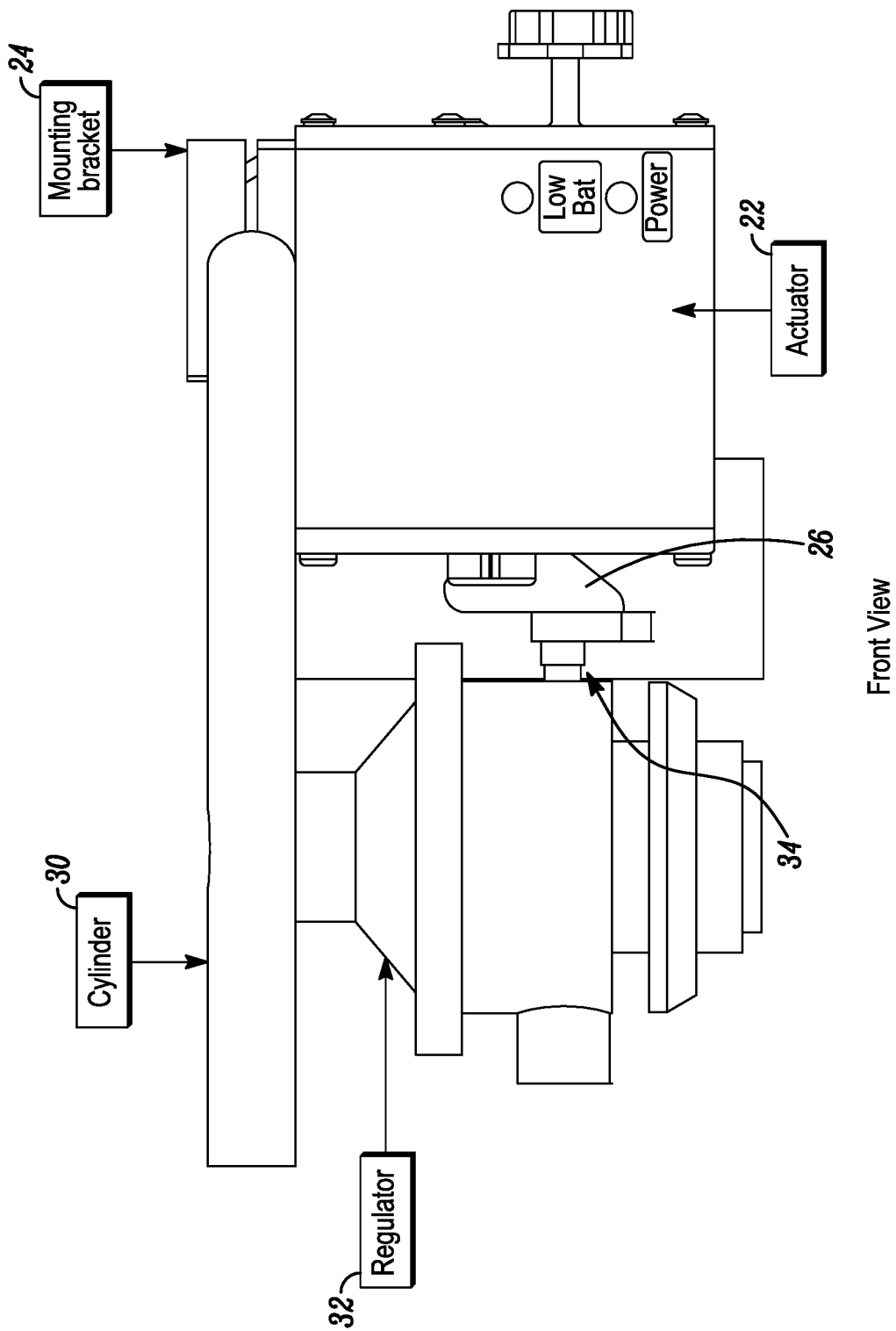
FIG. 3 is front view of a shutoff device coupled to or mounted on a fuel cylinder in accordance with disclosed embodiments.
Figure 4:
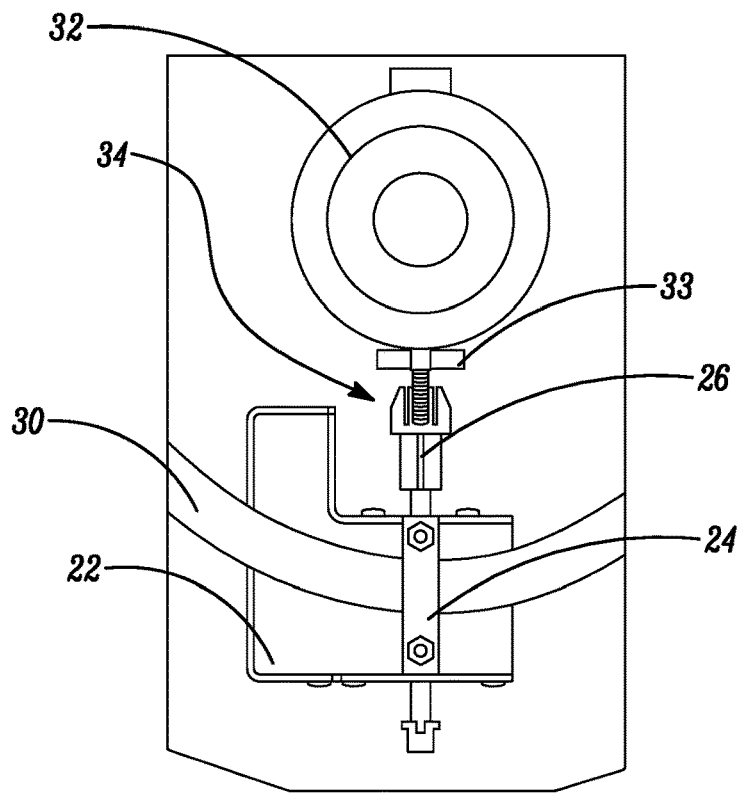
FIG. 4 is a top view of a shutoff device coupled to or mounted on a fuel cylinder in accordance with disclosed embodiments.

FIG. 2 is a perspective view of the shutoff device 20 coupled to or mounted on a fuel storage container 28 in accordance with disclosed embodiments, FIG. 3 is a front view of the shutoff device 20 coupled to or mounted on the fuel storage container 28 in accordance with disclosed embodiments, and FIG. 4 is a top view of the shutoff device 20 coupled to or mounted on the fuel storage container 28 in accordance with disclosed embodiments. As seen in FIG. 2, FIG. 3, and FIG. 4, the fuel storage container 28 can include a cylinder 30 at one end thereof, a regulator 32, a valve 34 of the regulator 32, and a knob 33 of the valve 34. The shutoff device 20 can be mounted to the cylinder 30 via the mounting bracket 24 to physically support the shutoff device 20 proximate the regulator 32, and the shutoff device 20 can be coupled to the valve 34 via the linking device 26 and the knob 33. When activated, the actuator 22 can cause the linking device 26 to rotate, which rotate the knob 33 until the shutoff device 20 senses, detects, or determines that a current position of the knob 33 has moved from a first (open) position indicative of the valve 34 being on to a second (closed) position indicative of the valve 34 being off.

Figure 7:
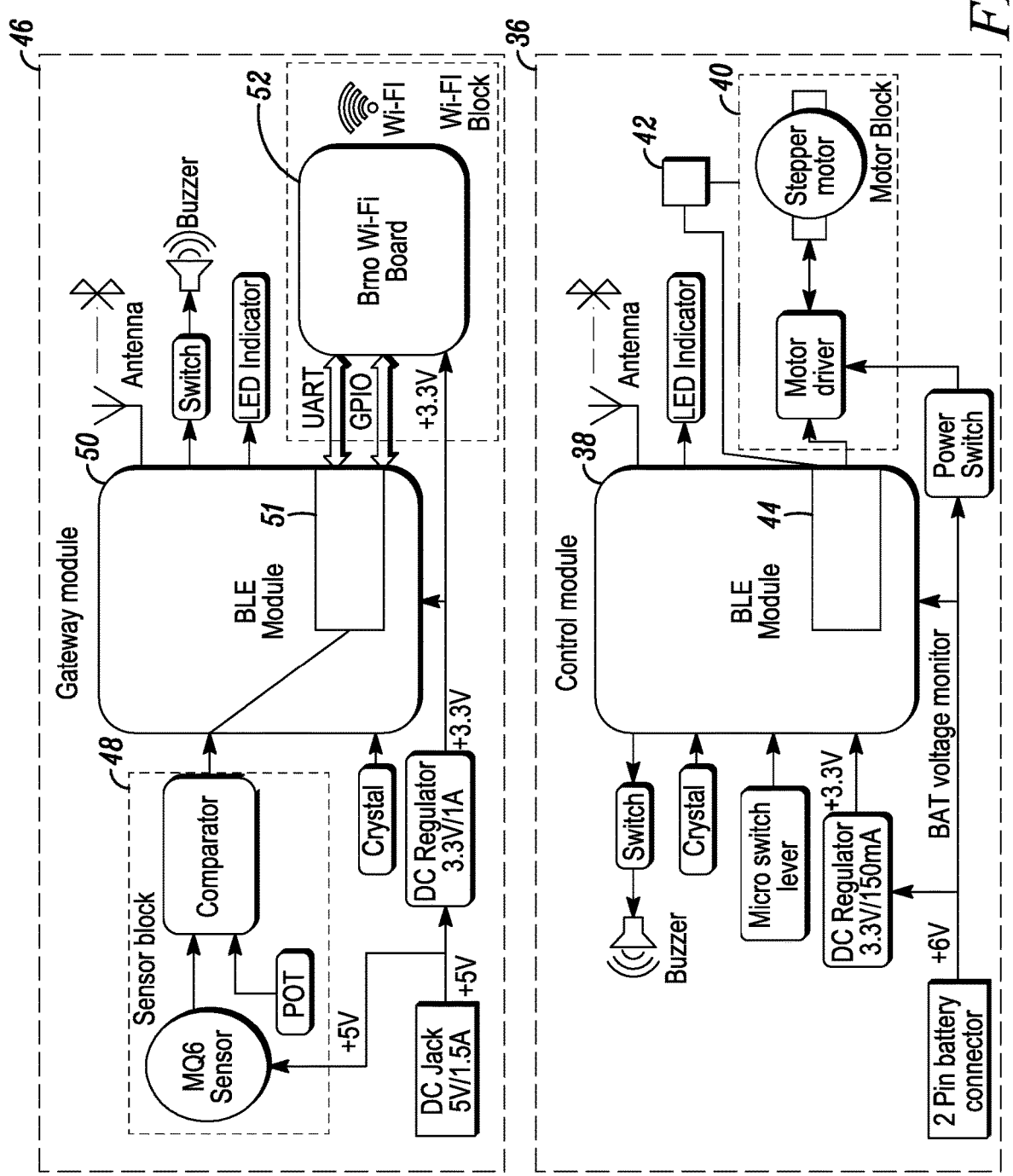
FIG. 7 is a block diagram of a gateway module and a control module in accordance with disclosed embodiments.

FIG. 7 is a block diagram of a control module 36 of a gateway module 46 in accordance with disclosed embodiments. For example, in some embodiments, the control module 36 can be part of the shutoff device 20, and in some embodiments, the control module 36 can be part of the actuator 22. As seen in FIG. 7, the control module 36 can include a wireless communications module 38, a motor block 40, a position sensor 42, and control circuits 44. In some embodiments, the wireless communications module 38 can include a Bluetooth low energy device, and the control circuits 44 can be integrated therewith. The wireless communications module 38 can receive a control signal, and responsive thereto, the control circuits 44 can activate components of the motor block 37, for example, a motor driver and a stepper motor, to rotate the linking device 26 to rotate the knob 33 to move the valve 34 from the first (open) position to the second (off) position. For example, in some embodiments, the position sensor 42 can determine that a current position of the valve 33 is indicative of the first (open) position and, responsive thereto, can transmit the control signal to the control circuits 44.

As seen in FIG. 7, the gateway module 46 can be separate and/or remote from the control module 36 and can include a sensor block 48, a wireless communications module 50 that communicates via a first wireless communications medium, control circuits 51, and a wireless communications module 52 that communicates via a second wireless communications medium that is different from the first wireless communications medium. For example, in some embodiments, the wireless communications module 50 can include a Bluetooth low energy device that communicates via Bluetooth, and the wireless communications module 52 can include a Wi-Fi device that communicates via Wi-Fi. The sensor block 48 can include sensor components known in the art for detecting a fuel leak. Accordingly, in some embodiments, responsive to the sensor block 48 detecting the fuel leak, the control circuits 51 can transmit the control signal to the control module 36 via the wireless communications module 50 and the wireless communications module 38. Additionally or alternatively, responsive to the sensor block 48 detecting the fuel leak, the control circuits 51 can transmit a detection signal to a remote device via the wireless communications module 52 and a first wireless communications module of the remote device. In some embodiments, the remote device can transmit the control signal to the control module 36 via the wireless communications module 38 and a second wireless communications module of the remote device that uses a wireless communications medium compatible with the wireless communications module 38. Additionally or alternatively, in some embodiments, the remote device can transmit the control signal to the gateway module 46 via the wireless communications module 52 and the first wireless communications module of the remote device and the control circuits 51 can forward the control signal to the control module 36 via the wireless communications module 50 and the wireless communications module 38.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A shutoff device comprising:
   a mounting bracket for mounting on a supply container;
   a linking device for coupling to a knob of a valve of a regulator of the supply container;
   a first wireless communications module that communicates via a first wireless communications medium for receiving the control signal and a second wireless communications module that communicates via a second wireless communications medium that is different from the first communications medium; and
   an actuator for, responsive to a control signal, automatically rotating the linking device, which rotates the knob, which rotates the valve from an on to an off position.

2. The shutoff device of claim 1 further comprising:
   a position sensor for determining whether a current position of the valve is indicative of the on position and, responsive thereto, transmitting the control signal to the actuator.

3. The shutoff device of claim 1 further comprising:
   the first wireless communications module for receiving the control signal from a gateway module and transmitting the control signal to the actuator.

4. The shutoff device of claim 3 wherein the gateway module includes a leak sensor for detecting a presence of a fuel leak and the second wireless communications module for, responsive thereto, transmitting the control signal to the first wireless communications module.

5. The shutoff device of claim 4 wherein the first wireless communications module includes a first Bluetooth low energy device and the second wireless communications module includes a second Bluetooth low energy device.

6. The shutoff device of claim 1 further comprising:
   a first wireless communications module for receiving the control signal from a remote device and transmitting the control signal to the actuator.

7. The shutoff device of claim 6 wherein the remote device includes the second wireless communications module and a third wireless communications module, receives a detection signal via the second wireless communications module responsive to a leak sensor detecting a presence of a fuel leak, and responsive to the detection signal, transmits the control signal to the first wireless communications module via the third wireless communications module.

8. The shutoff device of claim 7 wherein the first wireless communications module includes a first Bluetooth low energy device, the second wireless communications module includes a Wi-Fi device, and the third wireless communications module includes a second Bluetooth low energy device.

9. The shutoff device of claim 1 further comprising:
a processor for transmitting the control signal to the actuator at a predetermined time.

10. The shutoff device of claim 1 further comprising:
the second wireless communications module for transmitting a status report to a remote device.

11. A method comprising:
mounting a mounting bracket of a shutoff device on a supply container;
coupling a linking device of the shutoff device to a knob of a valve of a regulator of the supply container; and
communicating a control signal via a first wireless communications module in the shutoff device that communicates via a first wireless communications medium wherein the first wireless communications medium is different than a second wireless communications medium in the shutoff device communicating via a second wireless communications module;
responsive to a control signal, an actuator of the shutoff automatically rotating the linking device, which rotates the knob, which rotates the valve from an on position to an off position.

12. The method of claim 11 further comprising:
a position sensor of the shutoff device determining whether a current position of the valve is indicative of the on position and, responsive thereto, transmitting the control signal to the actuator.

13. The method of claim 11 further comprising:
the first wireless communications module of the shutoff device receiving the control signal from a gateway module and transmitting the control signal to the actuator.

14. The method of claim 13 further comprising:
a leak sensor of the gateway module detecting a presence of a fuel leak; and
responsive to the leak sensor detecting the presence of the fuel leak, the second wireless communications module of the gateway module transmitting the control signal to the first wireless communications module.

15. The method of claim 14 wherein the first wireless communications module includes a first Bluetooth low energy device and the second wireless communications module includes a second Bluetooth low energy device.

16. The method of claim 11 further comprising:
the first wireless communications module of the shutoff device receiving the control signal from a remote device and transmitting the control signal to the actuator.

17. The method of claim 16 further comprising:
a second wireless communications module of the remote device receiving a detection signal responsive to a leak sensor detecting a presence of a fuel leak; and
responsive to the detection signal, a third wireless communications module of the remote device transmitting the control signal to the first wireless communications module.

18. The method of claim 17 wherein the first wireless communications module includes a first Bluetooth low energy device, the second wireless communications module includes a Wi-Fi device, and the third wireless communications module includes a second Bluetooth low energy device.

19. The method of claim 11 further comprising:
a processor of the shutoff device transmitting the control signal to the actuator at a predetermined time.

20. The method of claim 11 further comprising:
the second wireless communications module of the shutoff device transmitting a status report to a remote device.

* * * * *